(12) United States Patent
Yamaguchi (10) Patent No.: US 9,446,788 B2
(45) Date of Patent: Sep. 20, 2016

(54) BALL SCREW MECHANISM AND STEERING DEVICE

(71) Applicant: JTEKT CORPORATION, Osaka-shi, Osaka (JP)

(72) Inventor: Masashi Yamaguchi, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/693,315

(22) Filed: Apr. 22, 2015

(65) Prior Publication Data

US 2015/0321690 A1   Nov. 12, 2015

(30) Foreign Application Priority Data

May 9, 2014  (JP) ................................ 2014-097838

(51) Int. Cl.
| | | |
|---|---|---|
| *B62D 5/04* | (2006.01) | |
| *F16H 25/22* | (2006.01) | |
| *F16H 25/20* | (2006.01) | |

(52) U.S. Cl.
CPC ........... *B62D 5/0448* (2013.01); *B62D 5/0424* (2013.01); *F16H 25/2214* (2013.01); *F16H 25/2223* (2013.01); *F16H 2025/2081* (2013.01); *F16H 2025/2096* (2013.01); *Y10T 74/19767* (2015.01)

(58) Field of Classification Search
CPC ............................ B62D 5/0445; B62D 5/0448
See application file for complete search history.

(56) References Cited

U.S. PATENT DOCUMENTS

| | | | | |
|---|---|---|---|---|
| 5,142,929 A | * | 9/1992 | Simpson, III | ....... F16H 25/2214 74/424.87 |
| 6,041,672 A | * | 3/2000 | Wang | .................. F16H 25/2214 74/424.87 |
| 6,702,060 B2 | * | 3/2004 | Tatewaki | ............. B62D 5/0434 180/444 |
| 7,631,572 B2 | * | 12/2009 | Fujita | ................... B62D 5/0448 384/43 |
| 2004/0020317 A1 | * | 2/2004 | Yamamoto | ........... B62D 5/0448 74/388 PS |
| 2004/0188171 A1 | * | 9/2004 | Mizuhara | ............. B62D 5/0448 180/444 |
| 2009/0090207 A1 | | 4/2009 | Chang et al. | |
| 2009/0260468 A1 | * | 10/2009 | Tachikake | ................ B62D 3/02 74/424.82 |
| 2010/0242652 A1 | | 9/2010 | Shirai et al. | |

FOREIGN PATENT DOCUMENTS

| | | |
|---|---|---|
| SU | 1 397 658 A1 | 6/1988 |
| WO | 2007/063696 A1 | 6/2007 |
| WO | 2007/114036 A1 | 10/2007 |

OTHER PUBLICATIONS

Sep. 4, 2015 Extended Search Report in European Patent Application No. 15165492.8.

* cited by examiner

*Primary Examiner* — Kevin Hurley
(74) *Attorney, Agent, or Firm* — Oliff PLC (57) ABSTRACT

A ball screw mechanism includes: a rack shaft, on the outer peripheral surface of which a spiral rack screw groove is formed; a cylindrical nut, on the inner peripheral surface of which a spiral nut groove that faces the rack screw groove is formed; and a plurality of balls disposed in a rolling passage that is a space surrounded by the rack screw groove and the nut groove. The nut is provided with: shift portions provided at both ends of the nut groove to shift the track of the nut groove in the axial direction of the rack shaft from the rack screw groove and to displace the nut groove to be deeper in the radial direction of the rack shaft as the track is shifted; a circulation passage that connects between the shift portions; and passage entrances that each connect between the shift portion and the circulation passage.

20 Claims, 10 Drawing Sheets

BALL SCREW MECHANISM AND STEERING DEVICE

INCORPORATION BY REFERENCE

The disclosure of Japanese Patent Application No. 2014-097838 filed on May 9, 2014 including the specification, drawings and abstract, is incorporated herein by reference in its entirety.

BACKGROUND OF THE INVENTION

1. Field of the Invention

The present invention relates to a ball screw mechanism and a steering device.

2. Description of the Related Art

Hitherto, there has been a steering device that applies an assist force to a steering mechanism, in which rotation of a motor is converted into reciprocal motion of a rack shaft using a ball screw mechanism to apply the rotation from the motor as the assist force. International Publication No. WO 2007/114036 describes an example of such a ball screw mechanism in which a screw shaft and a nut are threadably engaged with each other via a multiplicity of balls.

In the ball screw mechanism according to WO 2007/114036, a rolling groove for the balls is spirally formed on the outer peripheral surface of the screw shaft. In addition, a load rolling groove for the balls that faces the rolling groove for the balls in the screw shaft is spirally formed on the inner peripheral surface of the nut. Meanwhile, a no-load rolling groove for the balls is spirally formed along the load rolling groove to be deeper than the load rolling groove. Then, in the ball screw mechanism, a direction changing groove is further formed on the inner peripheral surface of the nut so that respective ends of the load rolling groove and the no-load rolling groove are coupled to each other on the inner peripheral surface of the nut. This eliminates the need for a so-called deflector (a component that forms a circulation path for the balls) for endless circulation of the balls.

In the ball screw mechanism according to WO 2007/114036, however, the no-load rolling groove and the direction changing groove are formed along the load rolling groove on the inner peripheral surface of the nut. Thus, a dimensional margin for forming the no-load rolling groove between load rolling grooves and a dimensional margin for forming the direction changing groove must be secured, which inevitably increases the size of the nut, that is, the ball screw mechanism.

SUMMARY OF THE INVENTION

It is an object of the present invention to provide a ball screw mechanism and a steering device capable of suppressing an increase in size even without a deflector.

An aspect of the present invention provides a ball screw mechanism including:
- a screw shaft, on an outer peripheral surface of which a spiral screw shaft-side rolling groove is formed;
- a cylindrical nut, on an inner peripheral surface of which a spiral nut-side rolling groove that faces the screw shaft-side rolling groove is formed; and
- a plurality of balls disposed in a rolling passage that is a space surrounded by the screw shaft-side rolling groove and the nut-side rolling groove, in which the nut is provided with:
- shift portions provided at both ends of the nut-side rolling groove to shift a track of the nut-side rolling groove in an axial direction of the screw shaft from the screw shaft-side rolling groove and to displace the nut-side rolling groove to be deeper in a radial direction of the screw shaft as the track of the nut-side rolling groove is shifted;
- a circulation passage that connects between the shift portions located at both ends of the nut-side rolling groove; and
- passage entrances that are entrances of passages that connect between the shift portions and the circulation passage; and the passage entrances are each positioned, in the axial direction of the screw shaft, between a starting position of the shift portion and a position facing an outermost periphery of a screw thread that is adjacent to the screw shaft-side rolling groove which faces the starting position of the shift portion.

With the configuration, when the balls of the ball screw mechanism roll through the rolling passage to reach the shift portion of the nut-side rolling groove, the balls gradually ride onto an adjacent screw thread while being pressed onto the side surface of the screw shaft-side rolling groove. A first passage entrance that leads from the shift portion to the circulation passage is provided between the position at which the balls start riding onto the screw thread and the position at which the balls have ridden onto the screw thread. Consequently, the balls pass through the shift portion to be led to the circulation passage. In addition, the balls led to the circulation passage pass through the nut to be led to a second passage entrance and a second shift portion, which is on the extension of the second passage entrance, and further to the rolling passage surrounded by the screw shaft-side rolling groove and the nut-side rolling groove. That is, if the shift portions and the passage entrances are provided in the inner periphery of the nut and the circulation passage is provided in the nut, the balls can be endlessly circulated even without a so-called deflector. In addition, the passage entrances are provided on the extension of the shift portions, and the circulation passage is provided in the nut body. Thus, the interval (lead) between rolling passages based on the screw shaft-side rolling groove can be reduced to reduce the overall length of the nut in the axial direction. Thus, an increase in size of the nut can be suppressed even without a deflector.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
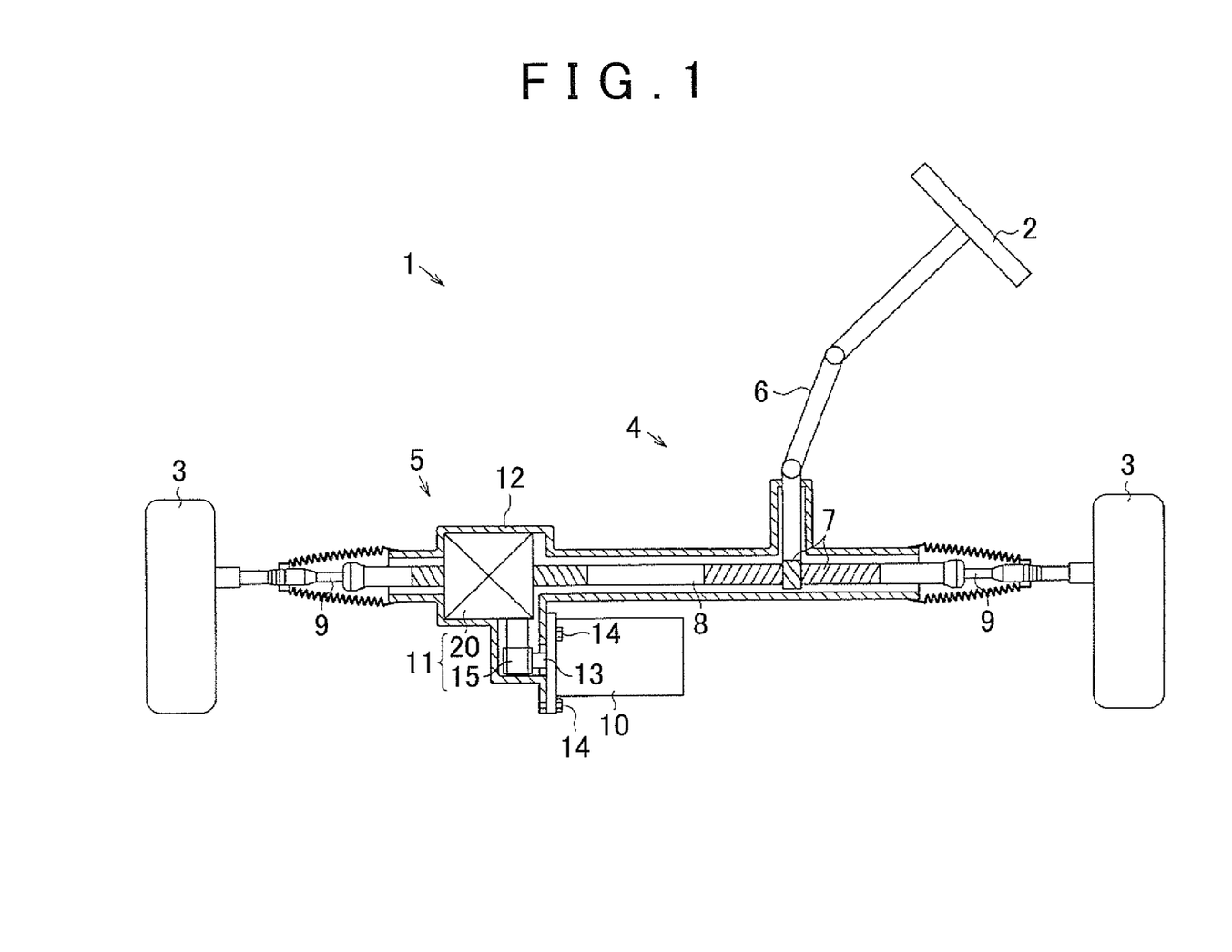
FIG. 1 illustrates a schematic configuration of a steering device.

A steering device on which a ball screw mechanism is mounted according to an embodiment of the present invention will be described below. As illustrated in FIG. 1, a steering device 1 is an electric power steering device, and includes a steering mechanism 4 that steers steered wheels 3 on the basis of an operation (hereinafter referred to as a "steering operation") of a steering wheel 2 performed by a driver, and an assist mechanism 5 that assists the driver in performing a steering operation.

The steering mechanism 4 includes a steering shaft 6 that serves as a rotary shaft of the steering wheel 2, and a rack-and-pinion mechanism 7 provided at the lower end portion of the steering shaft 6. The rack-and-pinion mechanism 7 includes a rack shaft 8 that has the function of a screw shaft. With the steering mechanism 4, when the steering shaft 6 is rotated along with a steering operation performed by the driver, rotational motion of the steering shaft 6 is converted into reciprocal motion (linear motion) of the rack shaft 8 in the axial direction by the rack-and-pinion mechanism 7. Reciprocal motion of the rack shaft 8 in the axial direction is transmitted to the steered wheels 3 via tie rods 9 coupled to both ends of the rack shaft 8 to vary the steering angle of the steered wheels 3 to change the advancing direction of the vehicle.

The assist mechanism 5 is provided around the rack shaft 8. The assist mechanism 5 is composed of a motor 10 and a power transmission mechanism 11. The power transmission mechanism 11 and the rack shaft 8 are covered by a housing 12. The motor 10 is assembled to the outer wall of the housing 12 by bolts 14 such that an output shaft 13 of the motor 10 extends in parallel with the center axis of the rack shaft 8. In addition, the output shaft 13 of the motor 10 extends into the housing 12. The power transmission mechanism 11 is composed of a ball screw mechanism 20 attached to the outer periphery of the rack shaft 8, and a speed reduction mechanism 15 that transmits rotation of the output shaft 13 of the motor 10 to the ball screw mechanism 20.

Figure 2:
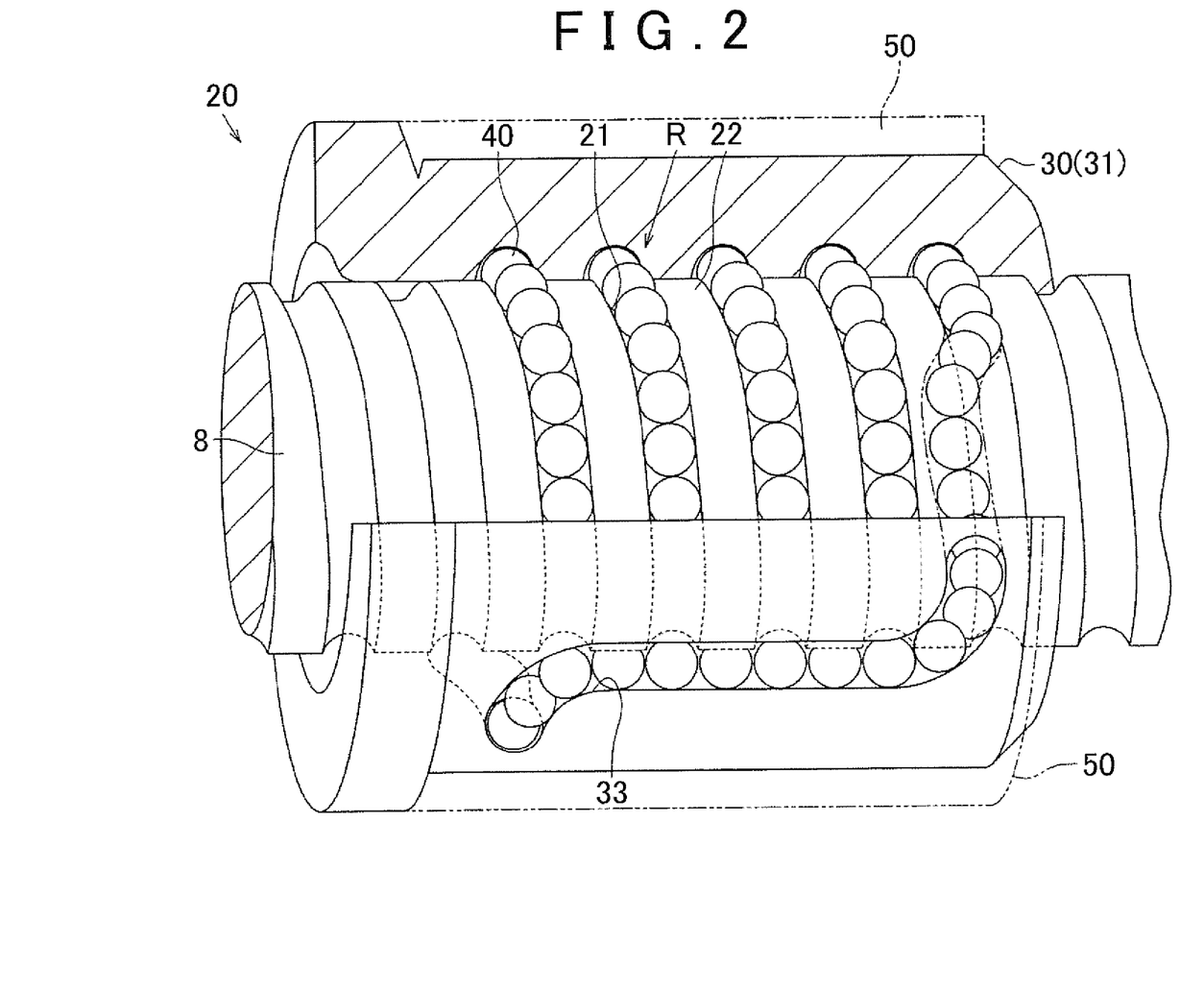
FIG. 2 illustrates a ball screw mechanism.

Next, the structure of the ball screw mechanism 20 will be described. As illustrated in FIG. 2, a spiral rack screw groove 21 is formed as a screw shaft-side rolling groove on the outer peripheral surface of a part of the rack shaft 8, and a spiral screw thread 22 is formed between the grooves. The rack screw groove 21 and the screw thread 22 are provided at a predetermined interval (lead). The outermost periphery of the screw thread 22 of the screw shaft is formed on the cylindrical surface.

The ball screw mechanism 20 includes a nut 30 (nut body 31), on the inner peripheral surface of which a spiral nut groove 32 is formed. The nut groove 32 is a nut-side rolling groove that faces the rack screw groove 21. In addition, the ball screw mechanism 20 includes a plurality of balls 40 disposed in a spiral rolling passage R that is a space surrounded by the rack screw groove 21 and the nut groove 32. The nut 30 is supported by a ball bearing so as to be rotatable with respect to the housing 12.

In addition, a circulation passage 33 that connects between two locations of the rolling passage R is formed on the outer periphery of the nut body 31 which is the body of the nut 30. That is, the balls 40 endlessly circulate through the rolling passage R via the circulation passage 33. In addition, a sleeve 50 is externally fitted on the nut body 31 so as to cover the circulation passage 33. A driven pulley is integrally attached to the outer peripheral surface of the sleeve 50. In the speed reduction mechanism 15, a driving pulley is integrally attached to the output shaft 13 of the motor 10. A belt is wound around the driven pulley and the driving pulley so that rotation of the output shaft 13 of the motor 10 is transmitted to the ball screw mechanism 20.

Figure 3:
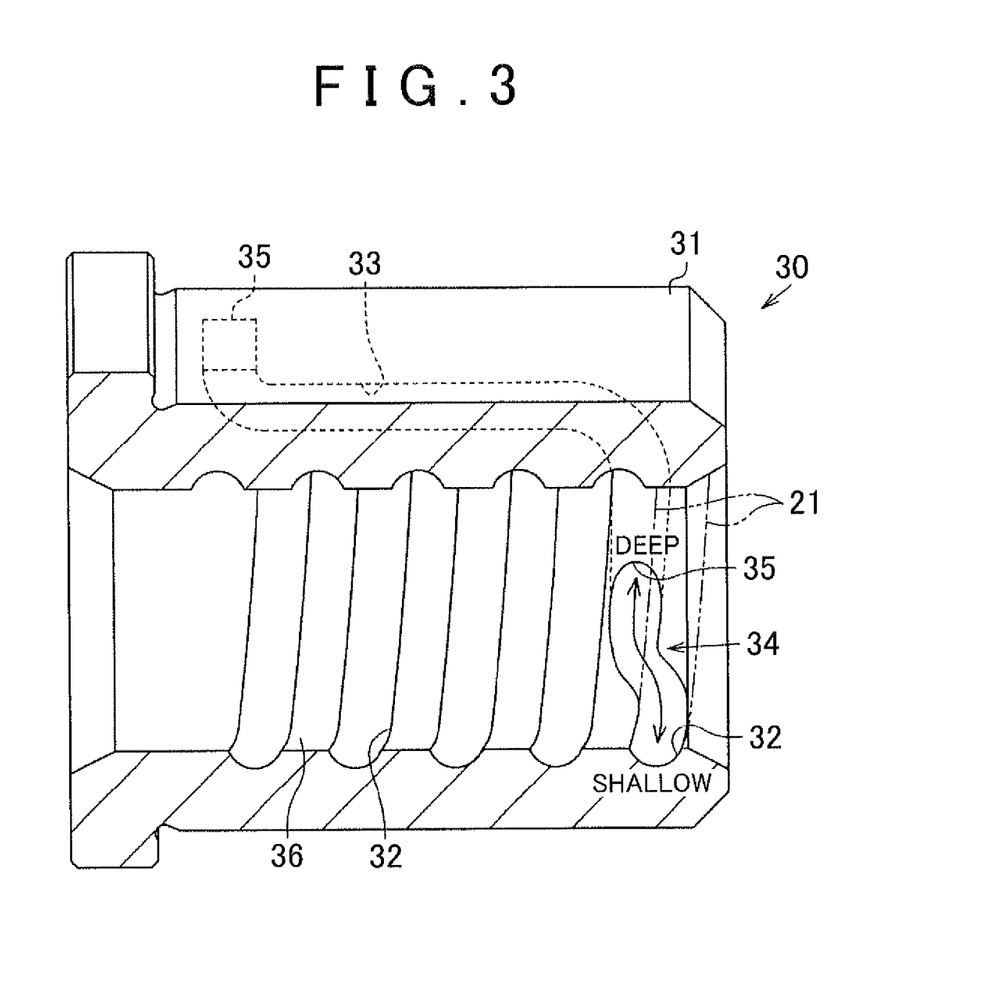
FIG. 3 is a sectional view illustrating a nut.
Figure 4:
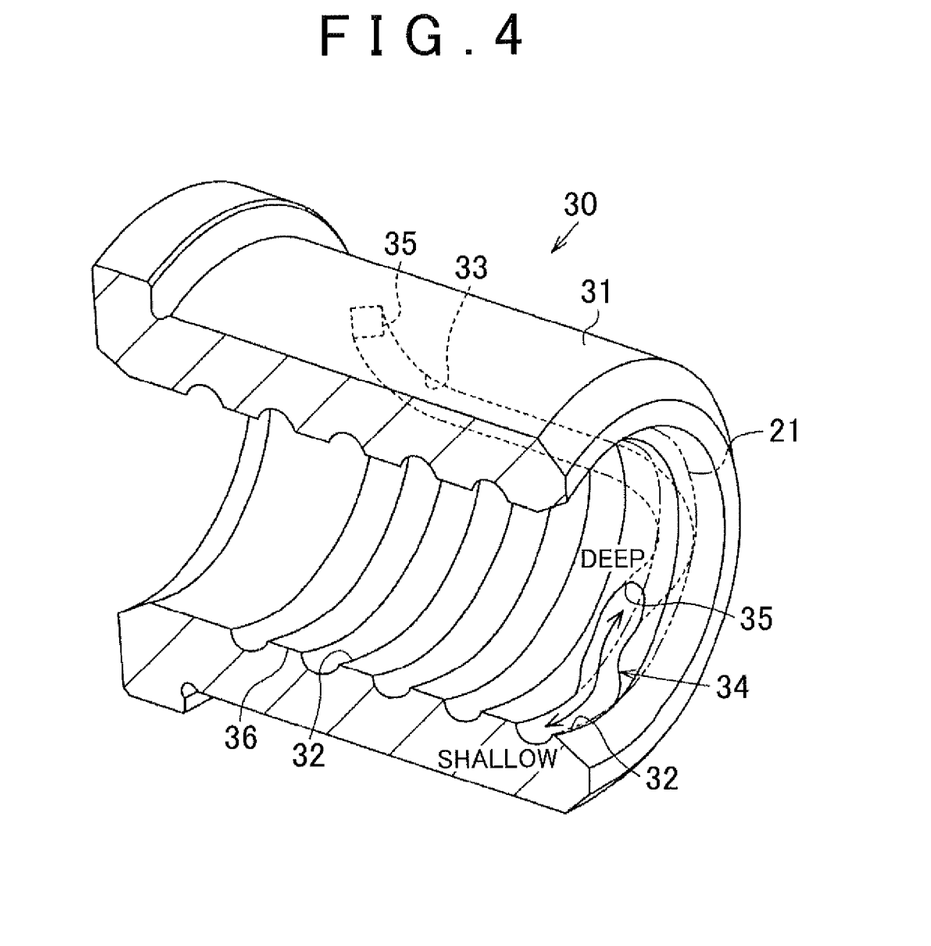
FIG. 4 is a sectional view illustrating a nut.

The nut 30 will be described in detail. As illustrated in FIGS. 3 and 4, the nut 30 includes a cylindrical nut body 31. A nut groove 32 that has generally the same depth as the rack screw groove 21 and that follows generally the same track as the rack screw groove 21 to face the rack screw groove 21 is formed on the inner periphery of the nut body 31. A spiral elevated portion 36 is formed between the grooves. The nut groove 32 and the elevated portion 36 are formed at generally the same interval (lead) as the predetermined interval (lead) of the rack shaft 8.

A shift portion 34 that shifts the track of the nut groove 32 from that of the rack screw groove 21 is formed at both ends of the nut groove 32. A passage entrance 35 that is an entrance to a passage to the circulation passage 33 is formed at the distal end of the shift portion 34. The track of the shift portion 34 is set so as to gradually approach the nut groove 32 which is adjacent thereto. In the embodiment, the shift of the track is set to about half the predetermined interval (lead), that is, about half the lead. In addition, the shift portion 34 is formed to be deeper at a location closer to the nut groove 32 which is adjacent thereto. That is, in the shift portion 34, the groove becomes deeper at a location closer to the passage entrance 35, and the groove becomes shallower at a location farther from the passage entrance 35 (in the region indicated by a double-headed arrow in the shift portion 34 in FIGS. 3 and 4).

Around the passage entrance 35, in addition, the track of the shift portion 34 passes through a position corresponding to the elevated portion 36, and the groove of the shift portion 34 faces the screw thread 22 of the rack shaft 8 rather than the rack screw groove 21. Then, around the passage entrance 35, the depth of the groove of the shift portion 34 is set to be equal to or more than the diameter of the balls 40 so that the balls 40 can pass over the screw thread 22.

Figure 5:
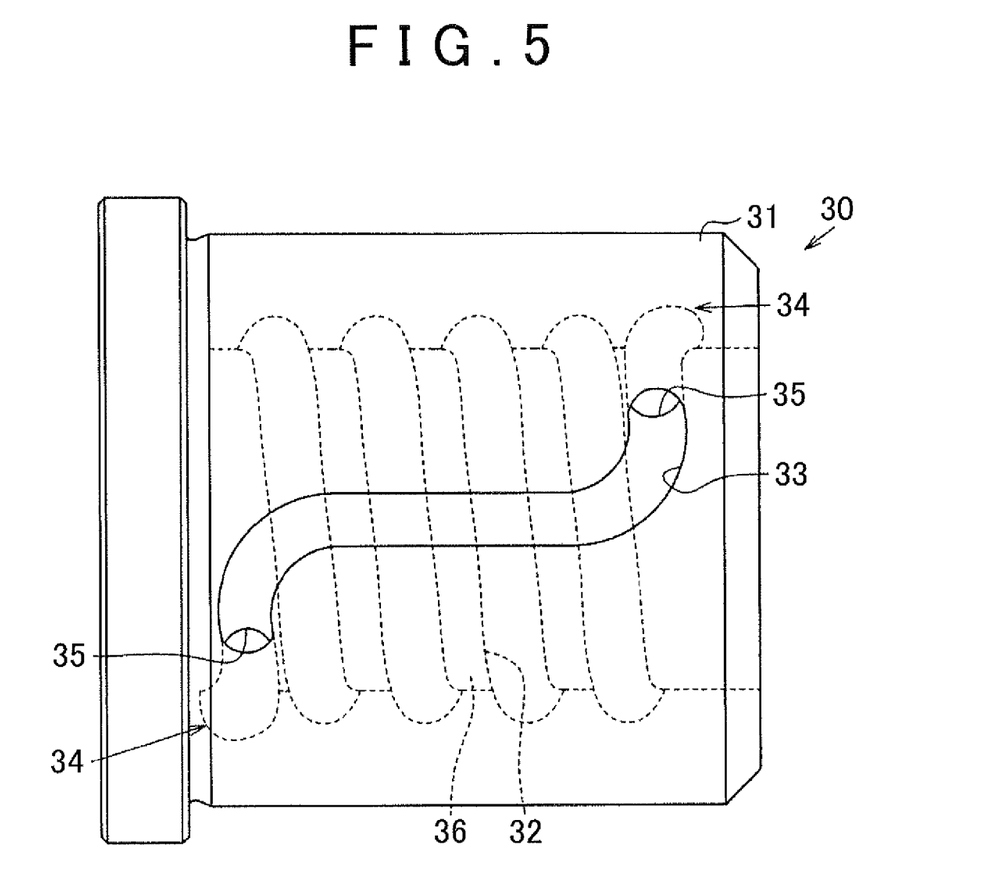
FIG. 5 illustrates a circulation passage in the nut.

As illustrated in FIGS. 3, 4, and 5, in addition, two sets of shift portions 34 and passage entrances 35 are formed in the nut body 31, and the circulation passage 33 which connects therebetween is provided on the outer periphery of the nut body 31 in a recessed manner, that is, formed in the shape of a groove formed on the outer periphery of the nut body 31. As illustrated in FIG. 5, in particular, the shift portions 34 and the passage entrances 35 are disposed such that the two passage entrances 35 are viewable at the same time in the case where the circulation passage 33 is viewed from the front.

In addition, the circulation passage 33 forms an S shape by extending in the circumferential direction along the outer periphery of the nut body 31 from the passage entrances 35 and connecting between the passage entrances 35. In addition, the circulation passage 33 is disposed in a region in which the circulation passage 33 connects between the passage entrances 35 such that the bottom of the circulation passage 33 is positioned slightly (e.g. by 2 millimeters) on the outer side of the bottom of the nut groove 32 in the radial direction. In addition, the depth and the width of the circulation passage 33 are set to be larger than the diameter of the balls 40 to enable the balls 40 to roll.

Figure 6:
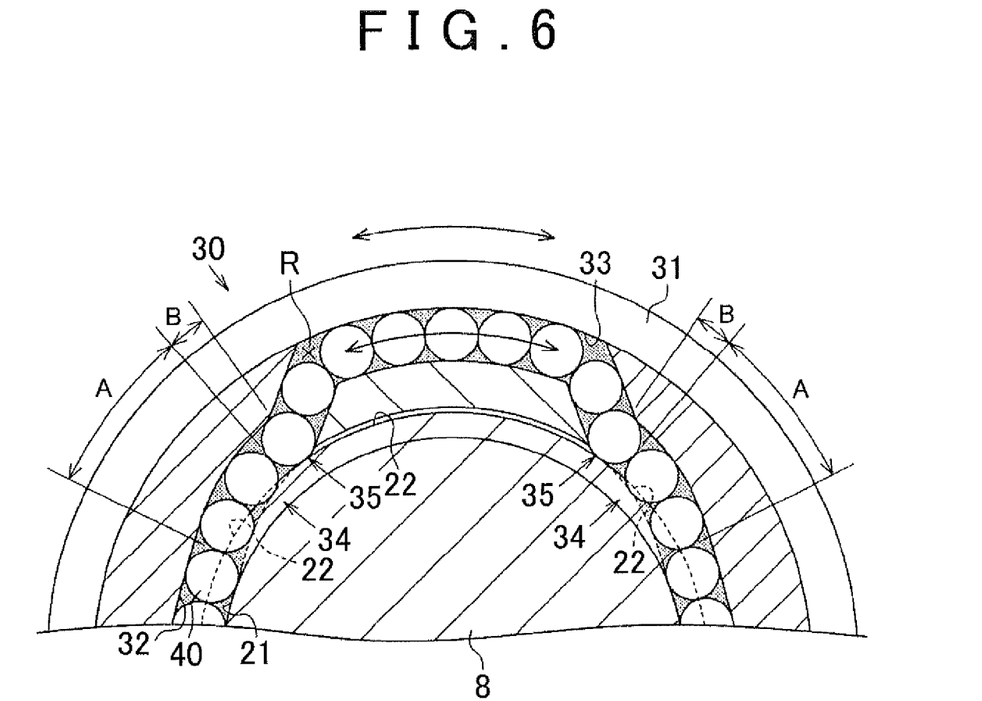
FIG. 6 is a sectional view illustrating how balls pass through a rolling passage, shift portions, passage entrances, and the circulation passage as seen from the axial direction of a rack shaft.
Figure 7:
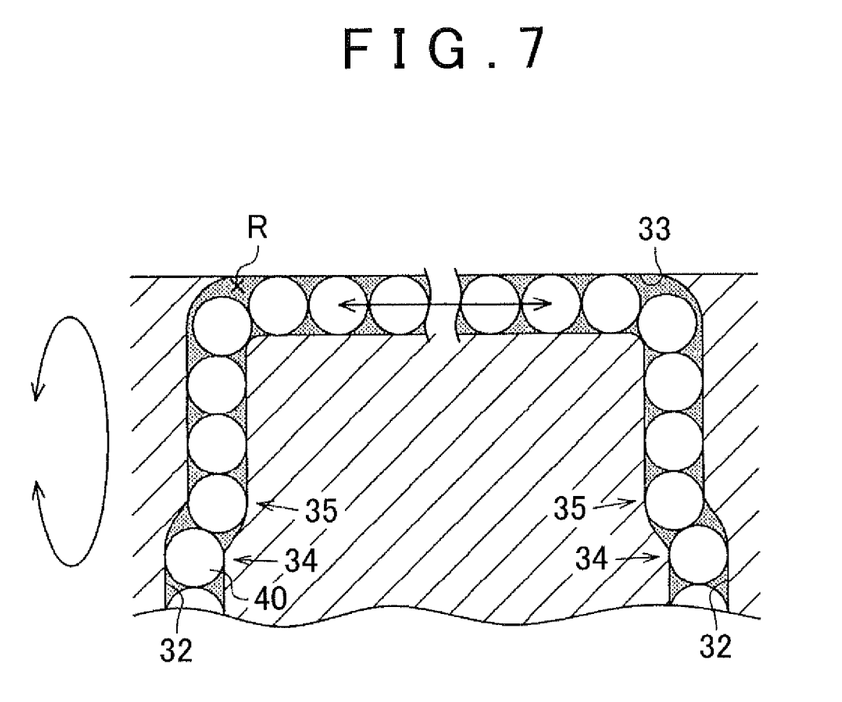
FIG. 7 is a sectional view illustrating how the balls pass through the rolling passage, the shift portions, the passage entrances, and the circulation passage as seen from a radial direction of the rack shaft.
Figure 8:
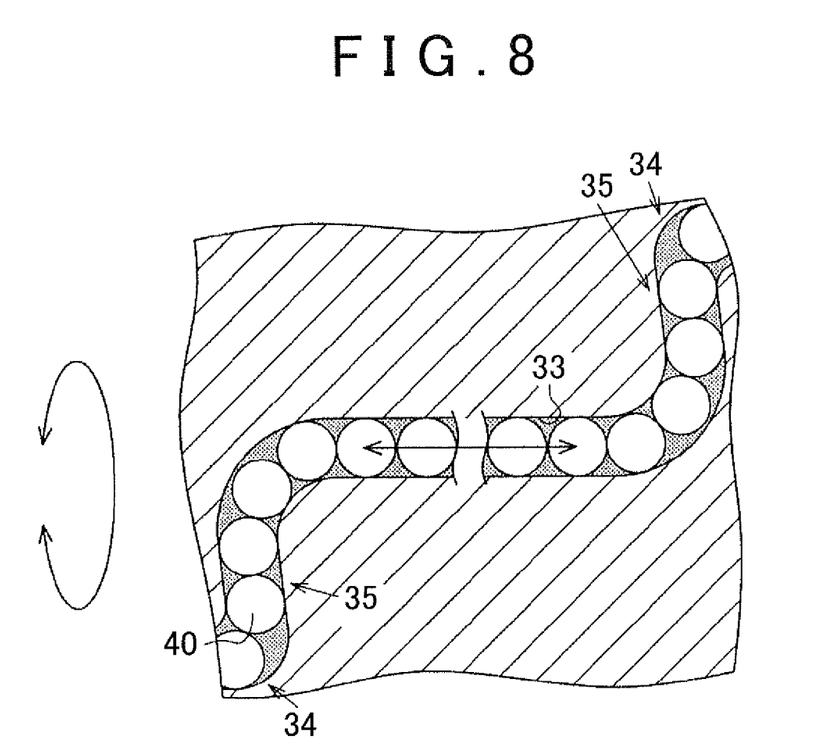
FIG. 8 is a sectional view illustrating how the balls pass through the shift portion, the passage entrance, and the circulation passage as seen from a radial direction of the rack shaft different from that in FIG. 7.

Then, as indicated by double-headed arrows in FIGS. 6 to 8, the balls 40 of the ball screw mechanism 20 roll in a predetermined direction in the circulation passage 33 as the nut 30 rotates in a predetermined direction in conjunction with the driving pulley. When the balls 40 reach the shift portion 34 after rolling through the rolling passage R surrounded by the rack screw groove 21 and the nut groove 32, in addition, the rolling passage R is gradually displaced toward the outer periphery of the nut 30 by a shift in track of the nut groove 32 in the shift portion 34 (in the axial direction of the nut, that is, the axial direction of the screw shaft) and a change in depth of the nut groove 32 (in the radial direction of the nut, that is, the radial direction of the screw shaft) along with the shift.

As illustrated in FIG. 6, when the track of the balls 40 is projected onto an identical plane seen from the axial direction of the nut 30, the balls 40 pass from a range A to a range B and into the circulation passage 33, and further from a range B to a range A. In FIG. 6, the portion painted with dots represents the rolling passage R and the circulation passage 33 for the balls 40.

That is, in the shift portion 34 in the range A in FIG. 6, the balls 40 are pressed onto one of the side surfaces of the rack screw groove 21 on the side to which the track is shifted, and gradually ride onto the side surface. Therefore, as the track of the nut groove 32 is shifted and the nut groove 32 is displaced in depth (becomes gradually deeper) along with the shift in the range A, the rolling passage R which extends along the bottom of the rack screw groove 21 is displaced toward the outer periphery of the nut 30 along the side surface of the rack screw groove 21, and extends away from the bottom of the rack screw groove 21.

After that, the balls 40 which pass through the shift portion 34 ride onto an adjacent screw thread 22 of the rack shaft 8. Therefore, as the track of the nut groove 32 is shifted and the nut groove 32 is displaced in depth along with the shift, the rolling passage R which extends along the side surface of the rack screw groove 21 extends away from the rack screw groove 21 to ride onto the screw thread 22 of the rack shaft 8, that is, the shift portion 34 and the screw thread 22 constitute the rolling passage R.

In FIG. 6, in addition, in the shift portion 34 in the range B, the balls 40 reach the passage entrance 35 after rolling along the screw thread 22 of the rack shaft 8 to be scooped up into the circulation passage 33 by the passage entrance 35. Therefore, the rolling passage R which has ridden onto the screw thread 22 of the rack shaft 8 transitions to, that is, connects to, the circulation passage 33 through the passage entrance 35.

After being scooped up into the circulation passage 33 by a first shift portion 34 and a first passage entrance 35, the balls 40 move along the circulation passage 33, and thereafter are returned from a second passage entrance 35 to a second shift portion 34 and further to the rolling passage R which is surrounded by the rack screw groove 21 and the nut groove 32 to endlessly circulate through a streak of circulation path.

In the case where the balls 40 pass through the passage entrance 35 from the circulation passage 33, in the shift portion 34 in the range B in FIG. 6, the balls 40 roll along the screw thread 22 of the rack shaft 8, and thereafter move away from the screw thread 22 to enter the rack screw groove 21. That is, in the shift portion 34 in the range A in FIG. 6, the balls 40 gradually move downward along the side surface of the rack screw groove 21 toward the bottom of the screw groove 21 while being pressed onto the side surface of the rack screw groove 21. Therefore, in the range A, as the track of the nut groove 32 is shifted and the nut groove 32 is displaced in depth (becomes gradually shallower) along with the shift, the rolling passage R which extends along the screw thread 22 of the rack shaft 8 is displaced along the side surface of the rack screw groove 21, and extends closer to the bottom of the rack screw groove 21.

After that, the balls 40 which have passed through the shift portion 34 are returned to the track which extends along the rack screw groove 21. FIGS. 7 and 8 illustrate how the balls 40 discussed above endlessly circulate. When the track of the balls 40 is projected onto an identical plane seen from the radial direction of the nut 30, the balls 40 pass from a shift portion 34 to a passage entrance 35 and into the circulation passage 33, and further from a passage entrance 35 to a shift portion 34. In FIGS. 7 and 8, the portion painted with dots represents the rolling passage R and the circulation passage 33 for the balls 40.

That is, in the shift portion 34, the balls 40 are displaced inward in the axial direction of the nut 30 while gradually riding onto the side surface of the rack screw groove 21. After that, the balls 40 which pass through the shift portion 34 ride onto an adjacent screw thread 22, and are displaced slightly outward in the axial direction of the nut 30. Then, the balls 40 pass through the passage entrance 35 to be scooped up into the circulation passage 33. Therefore, the rolling passage R which has ridden onto the screw thread 22 of the rack shaft 8 transitions to the circulation passage 33 through the passage entrance 35.

The balls 40 are displaced slightly inward in the axial direction of the nut 30 while passing through the passage entrance 35 from the circulation passage 33. Then, after passing through the passage entrance 35, the balls 40 move downward along an adjacent rack screw groove 21, and are displaced outward in the axial direction of the nut 30. Then, the balls 40 are returned to the track which extends along an adjacent rack screw groove 21 through the shift portion 34.

Next, the function and the effect of the ball screw mechanism 20 according to the embodiment will be described. As indicated in the range A of FIG. 6, when the balls 40 of the ball screw mechanism 20 roll through the rolling passage R to reach a first shift portion 34 of the nut groove 32, the balls 40 gradually ride onto an adjacent screw thread 22 while being pressed onto the side surface of the rack screw groove 21 on the side to which the track is shifted. Then, as indicated in the range B of FIG. 6, after the balls 40 ride onto the screw thread 22, the balls 40 move to the first passage entrance 35 to the circulation passage 33.

Consequently, the balls 40 pass through the shift portion 34 to be led to the circulation passage 33. In addition, the balls 40 led to the circulation passage 33 pass through the outer periphery of the nut body 31 to be led from a second passage entrance 35 to a second shift portion 34 and further to the rolling passage R surrounded by the rack screw groove 21 and the nut groove 32. That is, if the shift portions 34 and the passage entrances 35 are provided on the inner periphery of the nut body 31 and the circulation passage 33 is provided in the nut body 31, the balls can be endlessly circulated even without a so-called deflector.

In addition, the passage entrances 35 are provided on the extension of the shift portions 34 in the nut body 31, and the circulation passage 33 is provided on the outer periphery of the nut body 31. Thus, the lead of the rolling passage R can be reduced to reduce the length of nut body in the axial direction.

In addition, the shift portion 34 shifts the track inward in the axial direction of the nut 30. Thus, the axial dimension of the configuration for endless circulation of the balls 40 can be suppressed compared to a case where the track is shifted outward in the axial direction. In general, a predetermined interval (lead) defined by screw threads is required between adjacent rack screw grooves 21, that is, rolling passages R, in the ball screw mechanism 20. Therefore, the axial dimension of the configuration for endless circulation without use of a deflector can be suppressed to a minimum by providing the shift portion 34 utilizing the interval (lead).

If the circulation passage 33 is formed on the outer periphery of the nut body 31, the balls 40 passing through the circulation passage 33 may slip out of the ball screw mechanism 20 so that the ball screw mechanism 20 does not function normally. However, the sleeve 50 is externally fitted on the nut body 31, which prevents the balls 40 passing through the circulation passage 33 from slipping out of the ball screw mechanism 20.

The passage entrance 35 is formed at a position at which the balls 40 have ridden onto a screw thread 22 that is adjacent to the rack screw groove 21 which faces the shift portion 34. Consequently, the balls 40 can be easily scooped up into the circulation passage 33 compared to a case where the passage entrance 35 is formed at a position at which the balls 40 are riding onto the screw thread 22 in the shift portion 34. In addition, the steering device 1 according to the embodiment adopts the ball screw mechanism 20, an increase in size of which due to use of no deflector is suppressed. Therefore, an increase in outer dimension of the ball screw mechanism 20 can be suppressed.

The embodiment described above may be modified as appropriate to be implemented in the following forms. The sleeve 50 may not be provided as long as the circulation passage 33 can be sealed. For example, no sleeve 50 is required in the case where the circulation passage 33 is formed inside the nut body 31, that is, in the case where a closed tunnel-like circulation passage is formed.

The shift portion 34 may be formed so as to shift the track to the opposite side of an adjacent nut groove 32, that is, outward in the axial direction. The shift of the track by the shift portion 34 may be set to be less than half a lead, or may be set to be larger than half a lead.

The position of the passage entrance 35 may be changed in a range from the start of the shift portion 34 in the axial direction of the rack shaft 8 to a screw thread 22 that is adjacent to the rack screw groove 21 which faces the shift portion 34.

Figure 9:
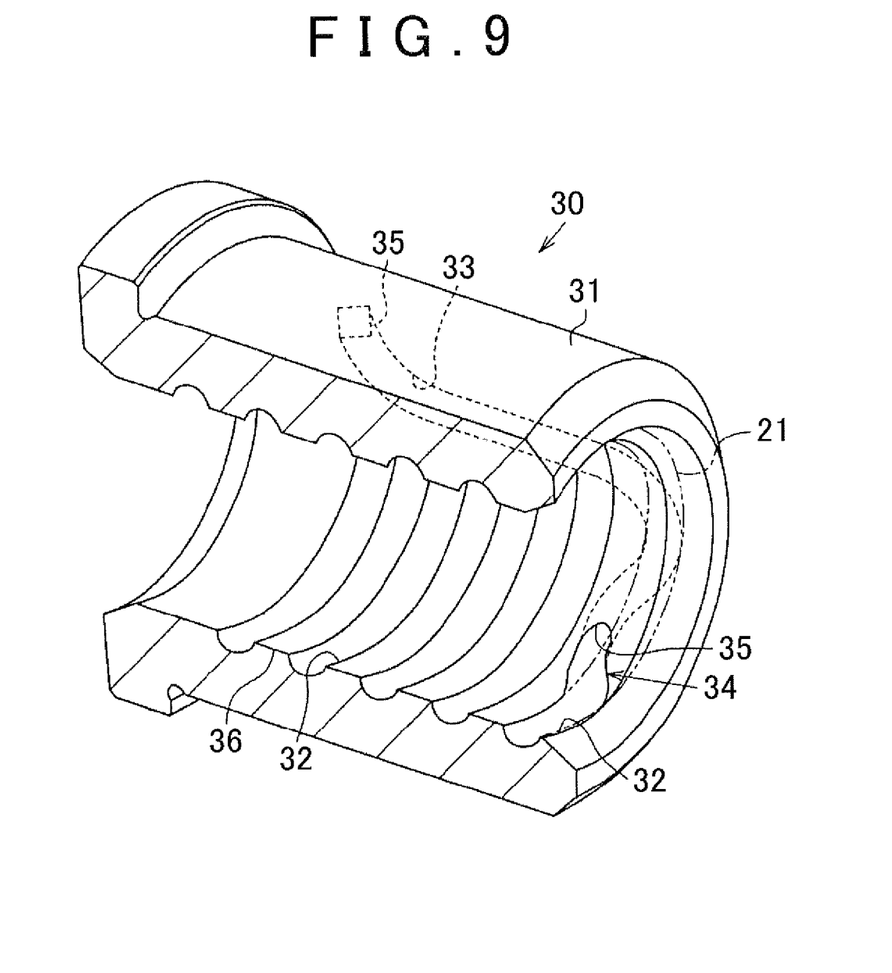
FIG. 9 is a sectional view illustrating a nut according to a different embodiment.
Figure 10:
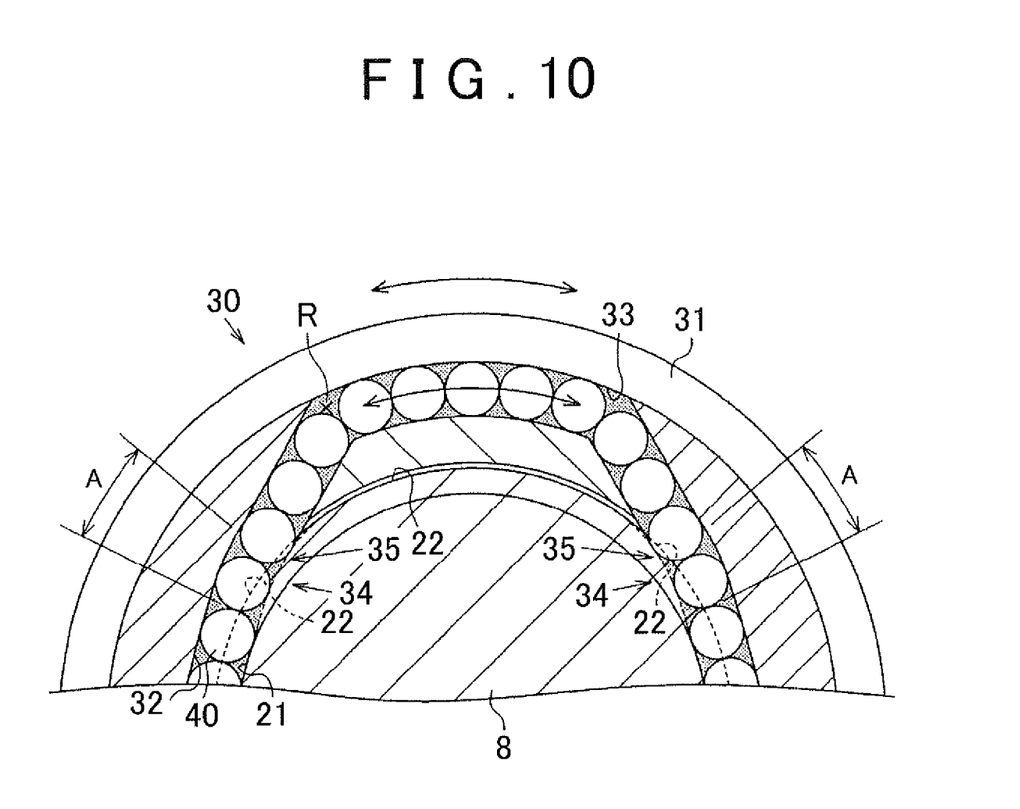
FIG. 10 is a sectional view illustrating how balls pass through a rolling passage, shift portions, passage entrances, and a circulation passage according to the different embodiment as seen from the axial direction of a rack shaft.

For example, as illustrated in FIGS. 9 and 10, the passage entrance 35 may be formed at a position at which the balls 40 are riding onto the side surface of the screw thread 22 that faces the shift portion 34. At a portion of the shift portion 34 around the passage entrance 35 according to a different embodiment illustrated in FIG. 9, the track of the shift portion 34 passes through a position corresponding to the elevated portion 36, and the groove of the shift portion 34 faces a part of the rack screw groove 21 and a part of the rack screw thread 22. Therefore, as illustrated in FIG. 10, in the shift portion 34 in the range A according to the different embodiment, the balls 40 are pressed onto the side surface of the rack screw groove 21 on the side to which the track is shifted, and gradually ride onto the side surface. When the balls 40 reach the passage entrance 35 while riding onto the side surface, the balls 40 are scooped up into the circulation passage 33.

In the embodiment described above, endless circulation of the balls 40 can be achieved by a streak of circulation path. Thus, a holder that prevents contact between the balls 40 during rolling of the balls 40 can be used. If a holder can be used to roll the balls 40, torque fluctuations related to rotation of the nut 30 can be suppressed, which contributes to improving the durability of the ball screw mechanism 20.

The ball screw mechanism 20 according to the embodiment described above may be applied not only to electric power steering devices but also to other steering devices. For example, the ball screw mechanism 20 may be applied to various steering devices that include a ball screw mechanism such as steer-by-wire steering devices. In addition, the ball screw mechanism 20 may be applied not only to steering devices but also to various devices that use a ball screw mechanism.

What is claimed is:

1. A ball screw mechanism comprising:
a screw shaft, on an outer peripheral surface of which a spiral screw shaft-side rolling groove is formed;
a cylindrical nut, on an inner peripheral surface of which a spiral nut-side rolling groove that faces the screw shaft-side rolling groove is formed; and
a plurality of balls disposed in a rolling passage that is a space surrounded by the screw shaft-side rolling groove and the nut-side rolling groove, wherein
the nut is provided with:
    shift portions provided at both ends of the nut-side rolling groove to shift a track of the nut-side rolling groove in an axial direction of the screw shaft from the screw shaft-side rolling groove and to displace the nut-side rolling groove to be deeper in a radial direction of the screw shaft as the track of the nut-side rolling groove is shifted;
    a circulation passage that connects between the shift portions provided at both ends of the nut-side rolling groove; and
    passage entrances that are each an entrance of a passage that connects between the shift portion and the circulation passage, and
the passage entrances are each positioned, in the axial direction of the screw shaft, between a starting position of the shift portion and a position facing an outermost periphery of a screw thread that is adjacent to the screw shaft-side rolling groove which faces the starting position of the shift portion.

2. The ball screw mechanism according to claim 1, wherein
the shift portions are formed at both ends of the nut-side rolling groove so as to shift a track of the shift portions toward a rolling groove that is adjacent to the nut-side rolling groove.

3. The ball screw mechanism according to claim 1, further comprising:
a sleeve externally fitted on the nut, wherein
the circulation passage is formed on an outer periphery of the nut.

4. The ball screw mechanism according to claim 2, further comprising:
a sleeve externally fitted on the nut, wherein
the circulation passage is formed on an outer periphery of the nut.

5. The ball screw mechanism according to claim 1, wherein
the passage entrances are each formed, in the axial direction of the screw shaft, at such a position as to face an outermost periphery of a screw thread of the screw shaft that is adjacent to the screw shaft-side rolling groove which faces the shift portion.

6. The ball screw mechanism according to claim 2, wherein
the passage entrances are each formed, in the axial direction of the screw shaft, at such a position as to face an outermost periphery of a screw thread of the screw shaft that is adjacent to the screw shaft-side rolling groove which faces the shift portion.

7. The ball screw mechanism according to claim 3, wherein
the passage entrances are each formed, in the axial direction of the screw shaft, at such a position as to face an outermost periphery of a screw thread of the screw shaft that is adjacent to the screw shaft-side rolling groove which faces the shift portion.

8. The ball screw mechanism according to claim 4, wherein
the passage entrances are each formed, in the axial direction of the screw shaft, at such a position as to face an outermost periphery of a screw thread of the screw shaft that is adjacent to the screw shaft-side rolling groove which faces the shift portion.

9. The ball screw mechanism according to claim 1, wherein
the passage entrances are each positioned, in an axial direction of the nut, between a starting position of the shift portion and a position of an elevated portion of a screw thread that is adjacent to the nut-side rolling groove to which the shift portion is connected.

10. The ball screw mechanism according to claim 2, wherein
the passage entrances are each positioned, in an axial direction of the nut, between a starting position of the shift portion and a position of an elevated portion of a screw thread that is adjacent to the nut-side rolling groove to which the shift portion is connected.

11. The ball screw mechanism according to claim 3, wherein
the passage entrances are each positioned, in an axial direction of the nut, between a starting position of the shift portion and a position of an elevated portion of a screw thread that is adjacent to the nut-side rolling groove to which the shift portion is connected.

12. The ball screw mechanism according to claim 1, wherein
the outermost periphery of the screw thread of the screw shaft is formed on a cylindrical surface.

13. The ball screw mechanism according to claim 2, wherein
the outermost periphery of the screw thread of the screw shaft is formed on a cylindrical surface.

14. The ball screw mechanism according to claim 3, wherein
the outermost periphery of the screw thread of the screw shaft is formed on a cylindrical surface.

15. The ball screw mechanism according to claim 5, wherein
the outermost periphery of the screw thread of the screw shaft is formed on a cylindrical surface.

16. A steering device comprising:
a ball screw mechanism including a steered shaft of a vehicle that acts as a screw shaft, a cylindrical nut provided with a spiral nut-side rolling groove that faces a spiral screw shaft-side rolling groove formed on an outer peripheral surface of the steered shaft, and a plurality of balls disposed in a rolling passage that is a space surrounded by the screw shaft-side rolling groove and the nut-side rolling groove;
a motor that applies torque to the nut; and
a speed reduction mechanism that transmits rotary torque of the motor to the nut, wherein
the ball screw mechanism according to claim 1 is used as the ball screw mechanism.

17. A steering device comprising:
a ball screw mechanism including a steered shaft of a vehicle that acts as a screw shaft, a cylindrical nut provided with a spiral nut-side rolling groove that faces a spiral screw shaft-side rolling groove formed on an outer peripheral surface of the steered shaft, and a plurality of balls disposed in a rolling passage that is a space surrounded by the screw shaft-side rolling groove and the nut-side rolling groove;
a motor that applies torque to the nut; and
a speed reduction mechanism that transmits rotary torque of the motor to the nut, wherein
the ball screw mechanism according to claim 2 is used as the ball screw mechanism.

18. A steering device comprising:
a ball screw mechanism including a steered shaft of a vehicle that acts as a screw shaft, a cylindrical nut provided with a spiral nut-side rolling groove that faces a spiral screw shaft-side rolling groove formed on an outer peripheral surface of the steered shaft, and a plurality of balls disposed in a rolling passage that is a space surrounded by the screw shaft-side rolling groove and the nut-side rolling groove;
a motor that applies torque to the nut; and
a speed reduction mechanism that transmits rotary torque of the motor to the nut, wherein
the ball screw mechanism according to claim 3 is used as the ball screw mechanism.

19. A steering device comprising:
a ball screw mechanism including a steered shaft of a vehicle that acts as a screw shaft, a cylindrical nut provided with a spiral nut-side rolling groove that faces a spiral screw shaft-side rolling groove formed on an outer peripheral surface of the steered shaft, and a plurality of balls disposed in a rolling passage that is a space surrounded by the screw shaft-side rolling groove and the nut-side rolling groove;
a motor that applies torque to the nut; and
a speed reduction mechanism that transmits rotary torque of the motor to the nut, wherein
the ball screw mechanism according to claim 5 is used as the ball screw mechanism.

20. A steering device comprising:
a ball screw mechanism including a steered shaft of a vehicle that acts as a screw shaft, a cylindrical nut provided with a spiral nut-side rolling groove that faces a spiral screw shaft-side rolling groove formed on an outer peripheral surface of the steered shaft, and a plurality of balls disposed in a rolling passage that is a space surrounded by the screw shaft-side rolling groove and the nut-side rolling groove;

a motor that applies torque to the nut; and
a speed reduction mechanism that transmits rotary torque of the motor to the nut, wherein
the ball screw mechanism according to claim 9 is used as the ball screw mechanism.

\* \* \* \* \*